(12) United States Patent
Booth et al.

(10) Patent No.: US 8,031,998 B2
(45) Date of Patent: Oct. 4, 2011

(54) ILLUMINATION FIBER OPTIC RIBBON

(75) Inventors: Carl S. Booth, Storrs, CT (US); Albert Michael Ermer, Jr., Seymour, CT (US); Gregory Fitts, Hamden, CT (US); Mark Wayne Grover, Portland, CT (US); William Hunt Pendleton, Cheshire, CT (US)

(73) Assignee: Amphenol Corporation, Wallingford, CT (US)

( * ) Notice: Subject to any disclaimer, the term of this patent is extended or adjusted under 35 U.S.C. 154(b) by 0 days.

(21) Appl. No.: 12/524,509

(22) PCT Filed: Jan. 25, 2008

(86) PCT No.: PCT/US2008/052053
§ 371 (c)(1),
(2), (4) Date: Jan. 12, 2010

(87) PCT Pub. No.: WO2008/092080
PCT Pub. Date: Jul. 31, 2008

(65) Prior Publication Data
US 2010/0110719 A1 May 6, 2010

Related U.S. Application Data

(63) Continuation of application No. 11/698,101, filed on Jan. 26, 2007, now abandoned, and a continuation of application No. 11/902,833, filed on Sep. 26, 2007, now abandoned.

(51) Int. Cl.
*G02B 6/04* (2006.01)
(52) U.S. Cl. .................. 385/115; 385/100; 385/114
(58) Field of Classification Search .................. 385/100, 385/114, 115
See application file for complete search history.

(56) References Cited

U.S. PATENT DOCUMENTS

| | | | | |
|---|---|---|---|---|
| 3,781,537 A | * | 12/1973 | Ramsey | 362/559 |
| 4,885,663 A | | 12/1989 | Parker | |
| 5,249,105 A | * | 9/1993 | Koizumi | 362/605 |
| 5,333,228 A | | 7/1994 | Kingstone | |
| 5,345,531 A | | 9/1994 | Keplinger et al. | |
| 5,416,875 A | | 5/1995 | Keplinger et al. | |
| 5,617,496 A | | 4/1997 | Kingstone | |
| 5,617,497 A | | 4/1997 | Kingstone | |
| 5,995,702 A | | 11/1999 | Tjonneland | |
| 6,050,715 A | | 4/2000 | Hunger | |
| 6,091,878 A | | 7/2000 | Abramowicz et al. | |
| 6,215,947 B1 | | 4/2001 | Abramowicz et al. | |
| 6,735,367 B2 | | 5/2004 | Sanso | |
| 6,922,519 B2 | | 7/2005 | Page | |
| 7,020,369 B2 | | 3/2006 | Lodge, Jr. et al. | |
| 7,163,326 B2 | | 1/2007 | Cassarly et al. | |
| 7,164,819 B2 | | 1/2007 | Jenson et al. | |
| 2004/0070992 A1 | | 4/2004 | Puleo et al. | |
| 2004/0179777 A1 | | 9/2004 | Buelow et al. | |
| 2004/0223691 A1 | | 11/2004 | Buelow et al. | |
| 2006/0232993 A1 | | 10/2006 | Cassarly et al. | |

* cited by examiner

*Primary Examiner* — Jennifer Doan
(74) *Attorney, Agent, or Firm* — Blank Rome LLP

(57) ABSTRACT

An illumination fiber optic ribbon includes optically-transmissive fibers which are adjacent to each other. At least two of the optically-transmissive fibers are twisted together to form a twisted segment. Where the two optically-transmissive fibers are not twisted forms a non-twisted segment. The twisted segments and non-twisted segments alternate along the length of the ribbon. Bends are disposed along the twisted segment and are formed by twisting adjacent optically-transmissive fibers. A light source is connected to one or both ends of the optically-transmissive fibers. The light source emits a light flux into the ribbon so that light emits from the bends in the twisted segment.

59 Claims, 12 Drawing Sheets

ILLUMINATION FIBER OPTIC RIBBON

CROSS-REFERENCE TO RELATED APPLICATION

This application is a continuation in part of U.S. patent application Ser. No. 11/698,101, entitled "Illumination Fiber Optic Ribbon," by Carl Booth et al., filed Jan. 26, 2007, and U.S. patent application Ser. No. 11/902,833, entitled "Illumination Fiber Optic Ribbon," by Carl Booth et al., filed Sep. 26, 2007, the disclosures of which are incorporated herein by reference in their entirety.

FIELD OF THE INVENTION

The present invention relates to fiber optic cables used for illumination. In particular, the present invention relates to an illumination fiber optic ribbon with alternating twisted segments from which light is emitted and non-twisted segments for better connection to a light source.

BACKGROUND OF THE INVENTION

Fiber optic cable is often used to transmit light in the longitudinal direction of the cable from one end of the cable to the other end. Fiber optic cables can also be made to transmit light radially away. Such radial light transmission is often used for area lighting, such as around swimming pools, walkways, signs, safety lighting, or decorative accent lighting. Fiber optic cables are often used instead of electrical cables because fiber optic cables require only one light source and the light source's electrical power can be at a distant location.

Such fiber optic cables use special methods of manufacture, such as inclusion of actinically-sensitive dyes or other light-scattering materials to enhance the radial transmission of light. Other approaches avoid special manufacturing methods by bundling a large number of individual fibers together or by bundling groups of wound fibers together. The bundling is not cost efficient and wastes emitted light since light from central fibers is blocked by outer fibers.

Additionally, known fiber optic cables do not provide a simple and efficient mechanism for connecting the fibers to a light source so that the maximum amount of light is sent into the cable and not reflected back to the light source or refracted away from the cable. Cable installers must unwind the cable and laboriously connect individual fibers to the light source. Additionally, known cables do not provide an efficient way to sever the cable to a desired length and then provide a labor-saving way to connect the severed end to a light source so that the maximum amount of light is accepted into the cable.

SUMMARY OF THE INVENTION

Accordingly, it is an aspect of the invention to provide an illumination fiber optic ribbon with alternating twisted segments from which light is emitted and non-twisted segments for optimal connection to a light source. The ribbon can be severed at one of the non-twisted segments and still provide optimal connection to the light source.

One embodiment of the present invention provides an illumination fiber optic ribbon. The ribbon includes optically-transmissive fibers disposed adjacent to each other, at least two of the optically-transmissive fibers being twisted together to form a twisted segment and the at least two optically-transmissive fibers being parallel to one another to form a non-twisted segment, the twisted and non-twisted segments alternating along a length of the ribbon; bends disposed along said twisted segments, the bends formed by the twisting of adjacent optically-transmissive fibers; and at least one of the non-twisted segments being capable of connection to a light source disposed at one or both ends of the optically-transmissive fibers, the light source emitting a light flux into the twisted and non-twisted segments of the optically-transmissive fibers so that light therefrom is emitted from the bends along the twisted segments.

Another embodiment of the present invention provides an illumination fiber optic ribbon. The ribbon includes optically-transmissive fibers disposed adjacent to each other, at least two of the optically-transmissive fibers being twisted together to form a twisted segment and the at least two optically-transmissive fibers being parallel to one another to form a non-twisted segment, the twisted and non-twisted segments alternating along a length of said ribbon; bends disposed along the twisted segments, the bends formed by the twisting of adjacent optically-transmissive fibers; at least one of the non-twisted segments being capable of connection to a light source disposed at one or both ends of said plurality of optically-transmissive fibers, the light source emitting a light flux into the twisted and non-twisted segments of the optically-transmissive fibers so that light therefrom is emitted from the bends along the twisted segments; and a sheath substantially enclosing the optically-transmissive fibers.

Yet another embodiment of the present invention provides a method of manufacturing an illumination fiber optic ribbon. The method of manufacturing includes the steps of: disposing a plurality of optically-transmissive fibers adjacent to one another; twisting adjacent optically-transmissive fibers in a portion of a length of the ribbon to form a twisted segment; forming a plurality of bends at a cladding on each of said plurality of optically-transmissive fibers by the twisting; providing a non-twisted segment in a portion of the length of the ribbon in which adjacent optically-transmissive fibers are not twisted; and alternating the non-twisted segments with the twisted segments.

Yet another embodiment of the present invention provides an illumination fiber optic ribbon. The illumination fiber optic ribbon includes optically-transmissive fibers disposed adjacent to each other, at least two of the plurality of optically-transmissive fibers being twisted together to form a twisted segment and the at least two optically-transmissive fibers being parallel to one another to form a non-twisted segment, the twisted and non-twisted segments alternating along a length of the ribbon; bends along the twisted segment formed by the twisting of adjacent optically-transmissive fibers, the bends per unit length increasing as the length of the ribbon increases; and at least one of the non-twisted segments being capable of connection to a light source disposed at one or both ends of the optically-transmissive fibers, the light source emitting a light flux into the twisted and non-twisted segments of optically-transmissive fibers so that light therefrom is emitted from the bends along the twisted segments.

Other objects, advantages and salient features of the invention will become apparent from the following detailed description, which, taken in conjunction with the annexed drawings, discloses a preferred embodiment of the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Referring to FIGS. 1-16, the present invention relates to a fiber optic ribbon 100 that transmits light from a light source to a distant area to provide illumination. Light preferably emits along the sides of the ribbon 100 and not merely at its ends to provide a greater illumination area. Portions of the ribbon 100 from where light is emitted, e.g. twisted segment 104a, alternate with portions of the ribbon 100 where light is conserved, e.g. non-twisted segment 106a, so that multiple areas may be illuminated while minimizing loss of light in transmission between areas. The ribbon 100 may be thin and compact. The thin and compact construction expands the potential locations where the ribbon 100 can be used. The construction of the ribbon 100 also simplifies the coupling of the ribbon 100 to a light source so that the maximum amount of light enters and is emitted by the ribbon 100.

Figure 1:
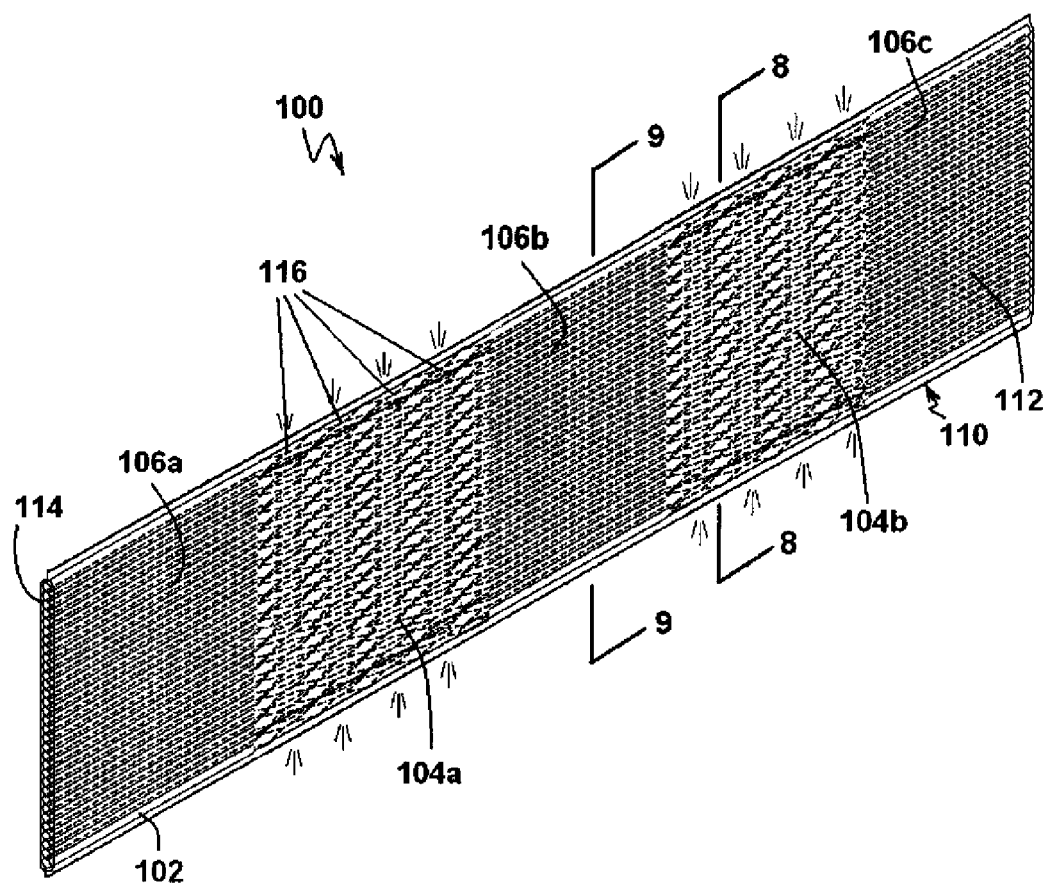
FIG. 1 is a perspective view illustrating an illumination fiber optic ribbon according to an embodiment of the present invention.

Referring to FIG. 1, the illumination fiber optic ribbon 100 is shown. The illumination fiber optic ribbon 100 may include a plurality of optically-transmissive fibers 102 with a plurality of bends 116 in twisted segments 104a and 104b from where light is emitted and a sheath 110. The optically-transmissive fibers 102 transmit light. The cross-sectional shape of the optically-transmissive fiber 102 can be of any shape and dimension. The length of the optically-transmissive fibers 102 is determined by the requirements of each particular application, such as the area to be illuminated or the distance to the light source. If the area to be illuminated is broad or if the area to be illuminated is at a great distance, then a longer length of fiber 102 may be required.

Figure 2:
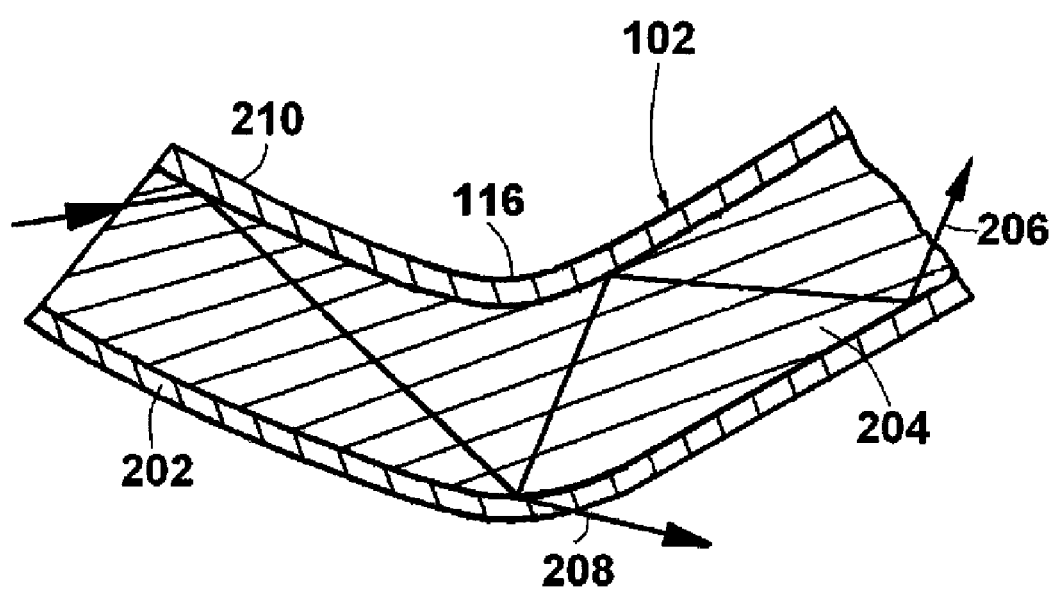
FIG. 2 is a partial sectional view of a optically-transmissive fiber of the illumination fiber optic ribbon illustrated in FIG. 1.

Referring to FIG. 2, a sectional view of the optically-transmissive fiber 102 with a representative bend 116 is shown. Each optically-transmissive fiber 102 is composed of a core 204 and a cladding 202 that substantially surrounds the core 204. Preferably, the core 204 and the cladding 202 are made of a substantially optically-transparent material. The cladding 202 causes light to travel away from the cladding 202 and towards the core 204 such that light 206 travels generally in the longitudinal direction of the core 204. In one exemplary embodiment, an index of refraction of the core 204 differs from an index of refraction of the cladding 202 so that light 206 is reflected towards the core 204 and away from the cladding 202, and thus, the light 206 travels generally in the longitudinal direction of the core 204. Preferably, the optically-transmissive fibers 102 are made of polymethylmethacrylate (PMMA), plastic, glass, or other similarly substantially optically-transparent materials.

In the twisted segments 104a and 104b of the ribbon 100, the twisting of the optically-transmissive fibers 102 causes bends 116 in the cladding 202 of the individual fibers 102. Due to the bends 116 in the cladding 202, the index of refraction of the cladding 202 is altered. The change in the index of refraction of the cladding 202 affects a critical angle of light or the angle at which the light 208 can be directed back to the core 204. The change in the critical angle of light allows the light 208 to emit through the bend 116. In alternate embodiments, the change in the index of refraction of the cladding 202 may be caused by distortions in the cladding 202 instead of by bending the cladding 202. The distortions in the cladding 202 may be caused chemically or mechanically. The cladding 202 may also be disrupted to allow light 208 to emit.

Figure 3:
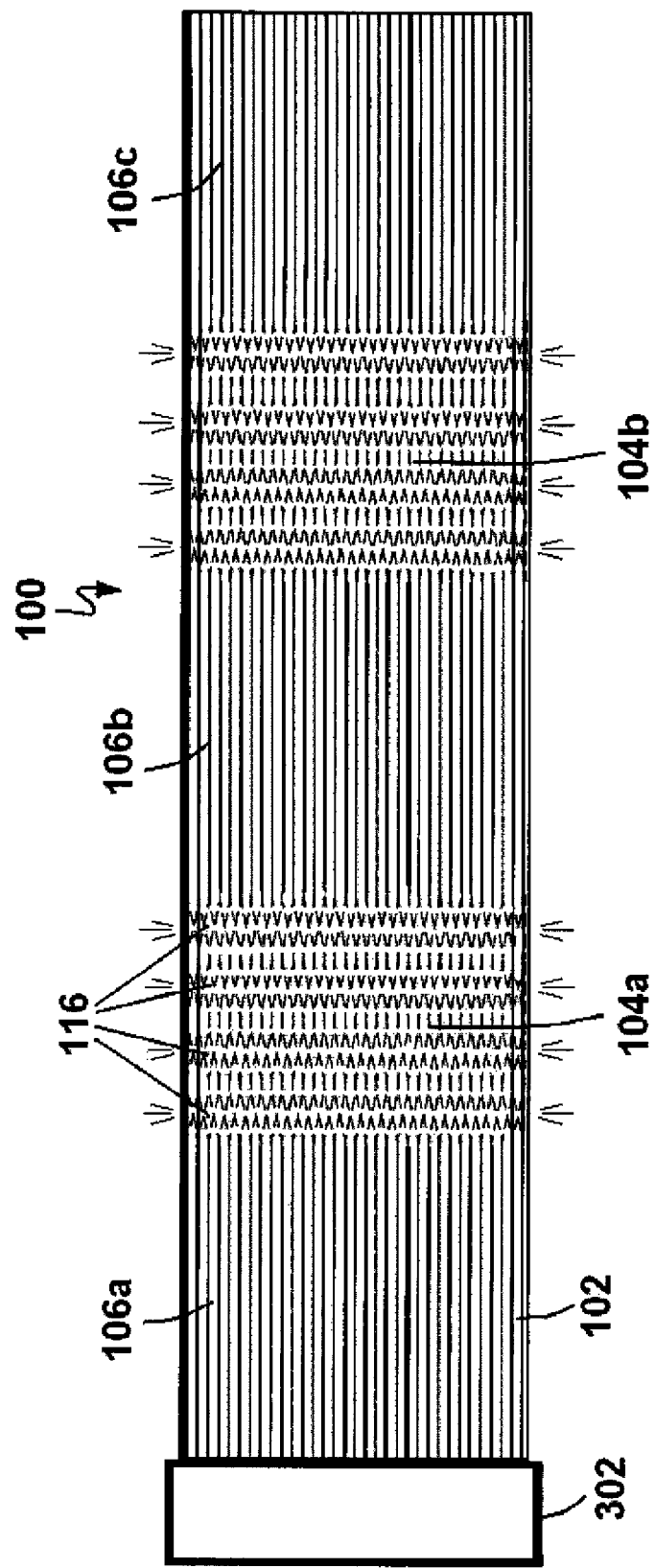
FIG. 3 is a plan view of the illumination fiber optic ribbon illustrated in FIG. 1.

As best seen in FIGS. 1 and 3, the optically-transmissive fibers 102 lie adjacent to one another to form the ribbon 100 for transmitting light. The number of optically-transmissive fibers 102 lying adjacent to each other may be increased or decreased to increase or reduce the size of the ribbon 100.

The ribbon 100 includes alternating twisted segments, such as segments 104a and 104b, and non-twisted segments, such as segments 106a, 106b, and 106c. The twisted segments 104a and 104b include at least two adjacent optically-transmissive fibers 102 twisted together. Preferably, all of the optically-transmissive fibers 102 are twisted into pairs at the twisted segments 104a and 104b. Portions where the adjacent optically-transmissive fibers 102 are not intertwined, that is parallel, form the non-twisted segments 106a-106c which may alternate with the twisted segments 104a and 104b. Although only two twisted segments 104a and 104b and three non-twisted segments 106a-106c are illustrated, the ribbon 100 may have more than two twisted segments 104a and 104b and more than three non-twisted segments 106a-106c, or only a single twisted segment and single non-twisted segment. Preferably, at least one non-twisted segment, such as 106a or 106c, is disposed at one or both ends of the ribbon 100 to facilitate connection to a light source 302. The light source 302 provides light. It may be an electrically-powered light source, a solar-powered light source, or a natural light source.

Figure 11:
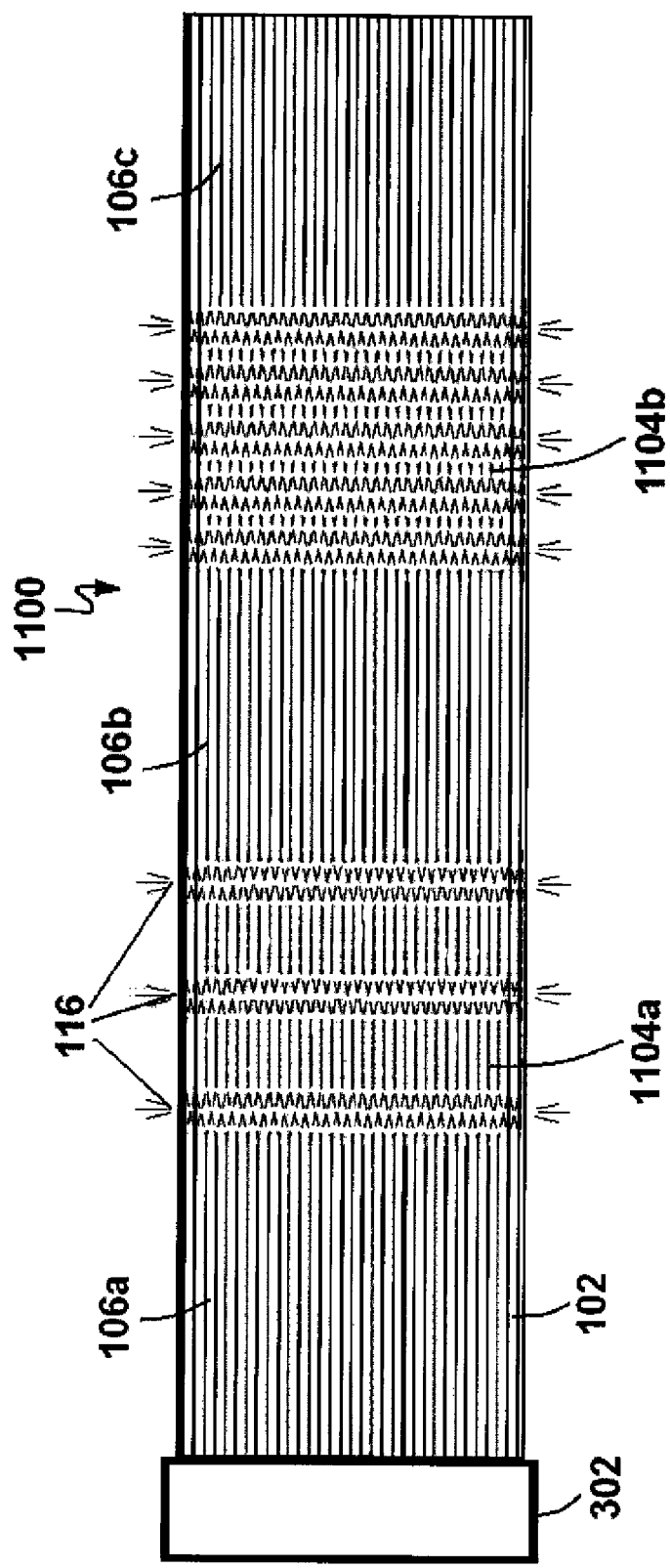
FIG. 11 is a plan view of an illumination fiber optic ribbon according to another embodiment of the present invention.

The light 208 provided by the light source 302 can attenuate as the length of the ribbon 100 increases. However, in certain applications, the attenuation in light 208 may be undesirable. Thus, to compensate for the attenuation in the light emitted from the ribbon 100 as its length increases, the bends 116 per unit length of the ribbon 100 can be increased as the length of the ribbon 100 increases. As described above, the twisting of optically-transmissive fibers 102 causes bends 116 in the cladding 202 of each fiber 102, and the bends 116 allow light 208 to be emitted. Accordingly, by increasing the twisting of optically-transmissive fibers 102, the number of bends 116 per unit length of the ribbon 100 can be increased which allows more light 208 to be emitted from the ribbon 100. Referring to FIG. 11, a plan view of an illumination fiber optic ribbon 1100 is shown. In ribbon 1100, the twisted segment 1104b may have more twisting of adjacent optically-transmissive fibers 102 than twisted segment 1104a. Thus, more light can be emitted from twisted segment 1104b than twisted segment 1104a. Because the bends 116 are formed by twisting adjacent optically-transmissive fibers 102, more twisting results in the twist lay length becoming shorter or tighter. The number of bends 116 per unit length can be increased progressively by increasing the twisting of fibers 102 progressively, or the number of bends 116 per unit length can be increased in stepped increments by increasing the twisting of fibers 102 in stepped increments.

Figure 4:
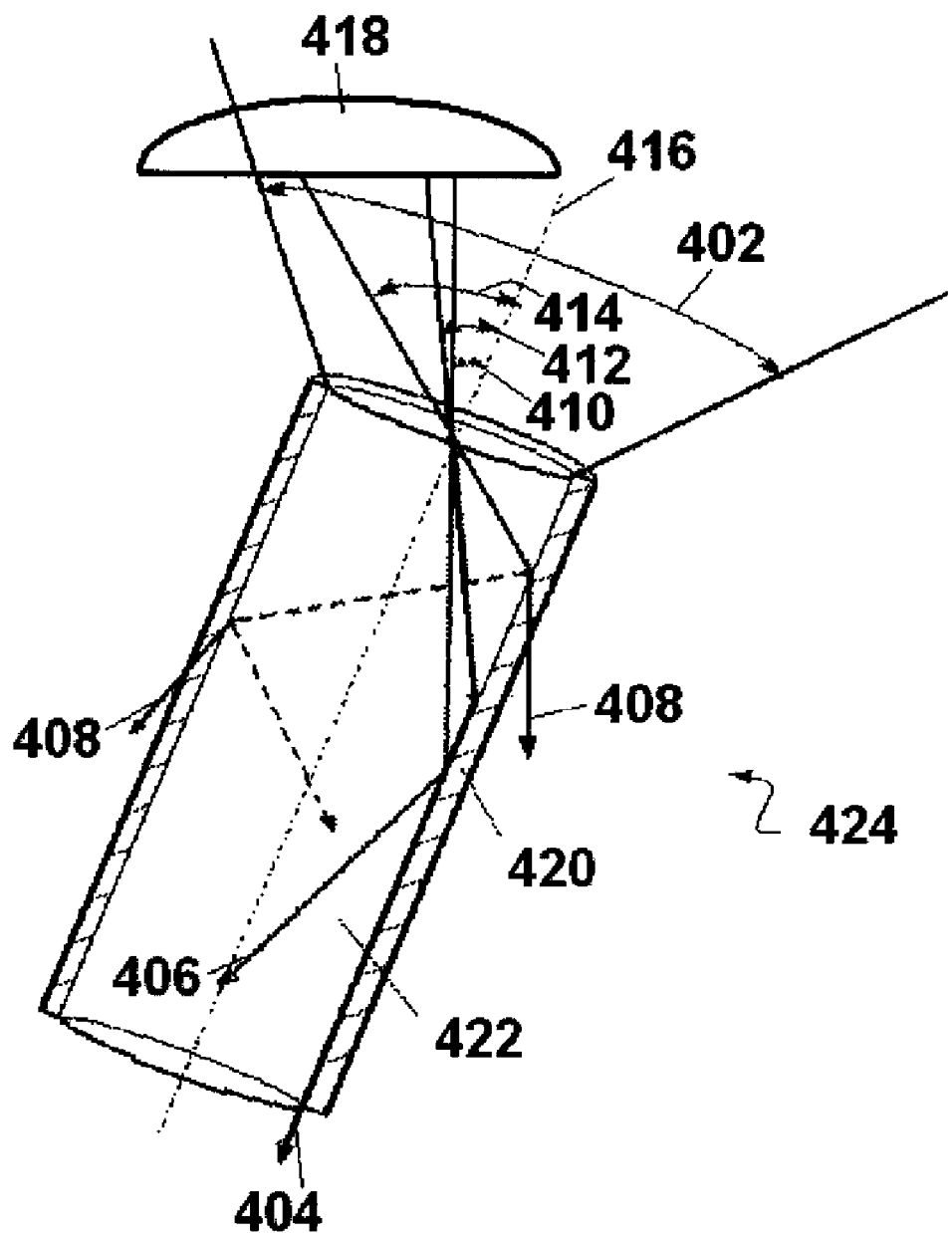
FIG. 4 is a sectional view of an optically-transmissive fiber coupled to a light source according to prior art.

Referring to FIG. 4, for maximum transmission of light along the optically-transmissive fiber 424, a light ray has to enter within a specified optimum acceptance angle 402 of the optically-transmissive fiber 424 where an acceptance angle is measured from a longitudinal axis 416 of the optically-transmissive fiber 424. The optimum acceptance angle 402 is also known as the maximum acceptance angle. Previously, an optically-transmissive fiber 424 may have been coupled to the light source 418 such that not all light rays were within the optimum acceptance angle 402. For instance, light ray 408 enters the optically-transmissive fiber 424 at an angle 414 relative to the longitudinal axis 416. The angle 414 is greater than the optimum acceptance angle 402 so that a portion of light ray 408 is able to escape through the cladding 420. As light ray 408 proceeds through the optically-transmissive fiber 102, additional portions of light ray 408 are able to escape through the cladding 420 so that light ray 408 attenuates as it travels through the optically-transmissive fiber 424. Light rays, such as 404 and 406, that enter the optically-transmissive fiber 424 at an angle equal to or less than the optimum acceptance angle 402 transmit through the optically-transmissive fiber 102 without escaping through the cladding 420. Light ray 404 enters the optically-transmissive fiber 102 at an angle 412 equal to the optimum acceptance angle 402 measured relative to the longitudinal axis 416 and reflects to travel in a direction substantially parallel to the longitudinal axis 416 of the optically-transmissive fiber 424. Another light ray 406 enters the optically-transmissive fiber 424 at an angle 410 smaller than the optimum acceptance angle 402 measured relative to the longitudinal axis 416. Light ray 406 travels longitudinally through the optically-transmissive fiber 424 by being repeatedly reflected towards the core 422 by the cladding 420.

The optimum acceptance angle 402 is determined by a numerical aperture of the optically-transmissive fiber 424. The numerical aperture is a value that can be readily found by one skilled in the art for a particular optically-transmissive fiber 424. The numerical aperture is defined as the square-root of the difference of the squares of the index of refraction for the core and the index of refraction for the cladding or $\sqrt{(\text{index of refraction of the core})^2 - (\text{index of refraction of the cladding})^2}$. The numerical aperture is also the sine of the optimum acceptance angle 402 or sine (optimum acceptance angle 402). Therefore, to find the optimum acceptance angle 402 for a particular optically-transmissive fiber 424, find the inverse sine or arcsine of the numerical aperture, a value readily obtained for a particular optically-transmissive fiber 424. The optimum acceptance angle 402 derived from the numerical aperture is relative to the longitudinal axis 416 of the optically-transmissive fiber 424.

Figure 5:
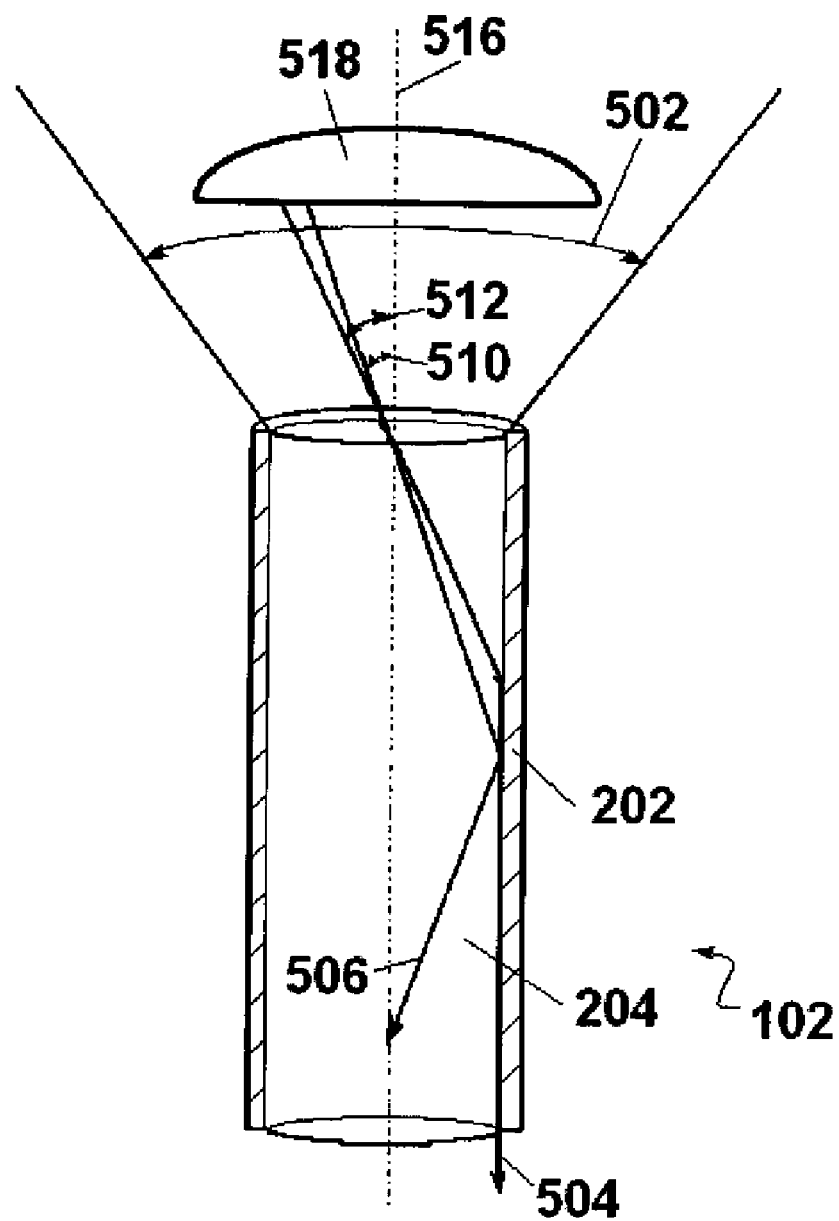
FIG. 5 is a sectional view of an optically-transmissive fiber coupled to a light source according to an embodiment of the present invention.

Referring to FIG. 5, for the ribbon 100, the optically-transmissive fibers 102 may be positioned for connection to the light source 518 so that light rays will be within the optimum acceptance angle 502. Substantially all the light rays, such as light ray 504 and 506, from the light source 518 are within the optimum acceptance angle 502. A light ray 504 that enters the optically-transmissive fiber 102 at an angle 512 equal to the optimum acceptance angle 502 measured relative to the longitudinal axis 516 reflects to travel in a direction substantially parallel to the longitudinal axis 516 of the optically-transmissive fiber 102. A light ray 506 that enters the optically-transmissive fiber 102 at an angle 510 smaller than the optimum acceptance angle 502 measured relative to the longitudinal axis 516 travels longitudinally through the optically-transmissive fiber 102 by being repeatedly reflected towards the core 204 by the cladding 202.

Figure 6:
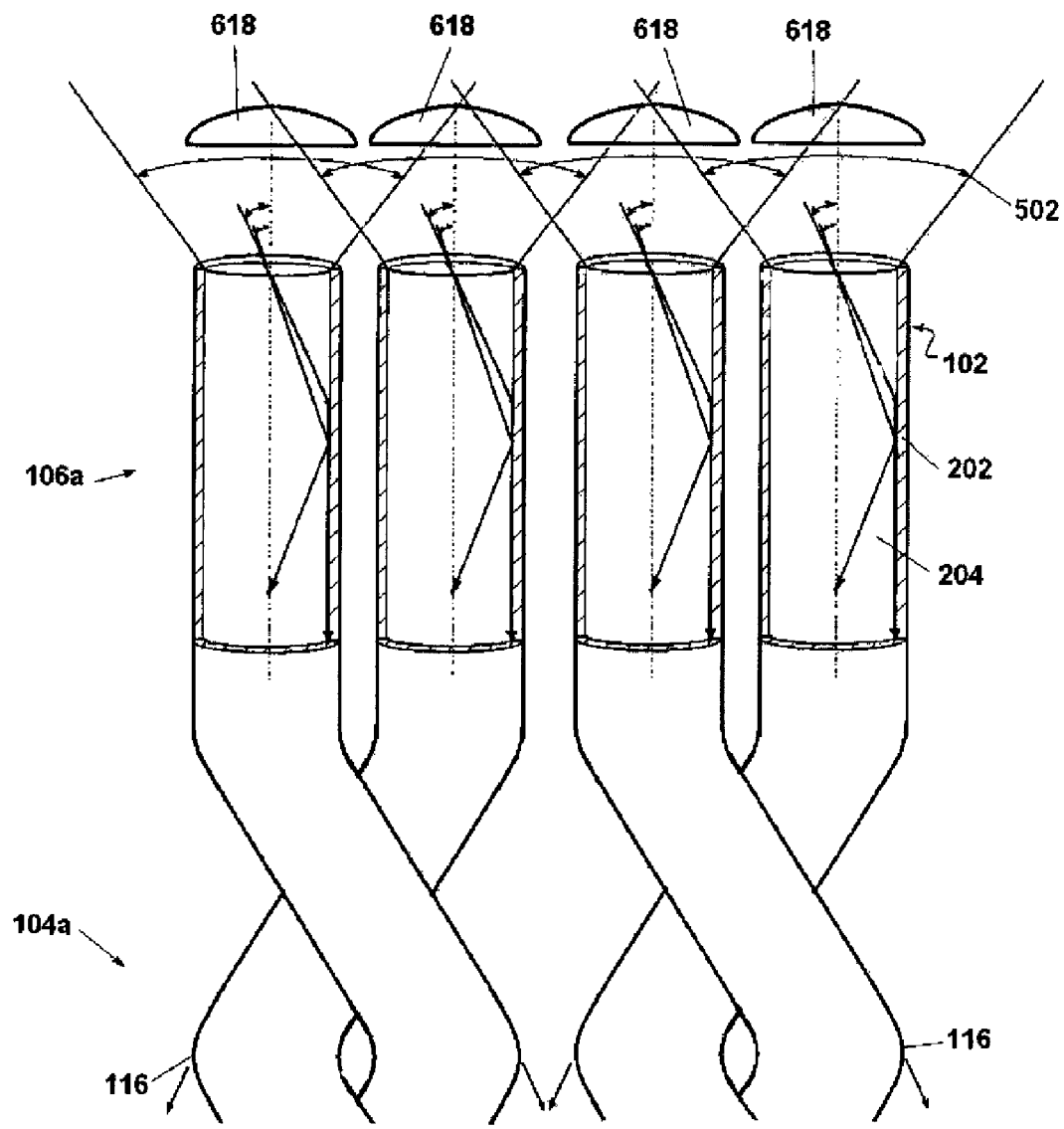
FIG. 6 is a partial plan view of the illumination fiber optic ribbon with a sectional view of the optically-transmissive fibers in a non-twisted segment of the illumination fiber optic ribbon.

Referring to FIG. 6, the non-twisted segment 106a of the ribbon 100 may be positioned for connection to multiple array light sources 618 so that the light rays from the light sources 618 are within the optimum acceptance angle 502 of the optically-transmissive fibers 102. The light source 618 may be a multiple array planar light source as depicted. Since the optically-transmissive fibers 102 in the non-twisted segment, such as 106a, are substantially parallel to one another, several optically-transmissive fibers 102 may be positioned for connection to the light source 618 so that light rays therefrom will be substantially within the optimum acceptance angle 502. Only two pairs of optically-transmissive fibers 102 are shown in FIG. 6 for clarity. However, the number of pairs depicted is not meant to be limiting to the invention. The ribbon 100 may have one pair of optically-transmissive fibers 102 or a multitude of pairs of optically-transmissive fibers 102.

Figure 7:
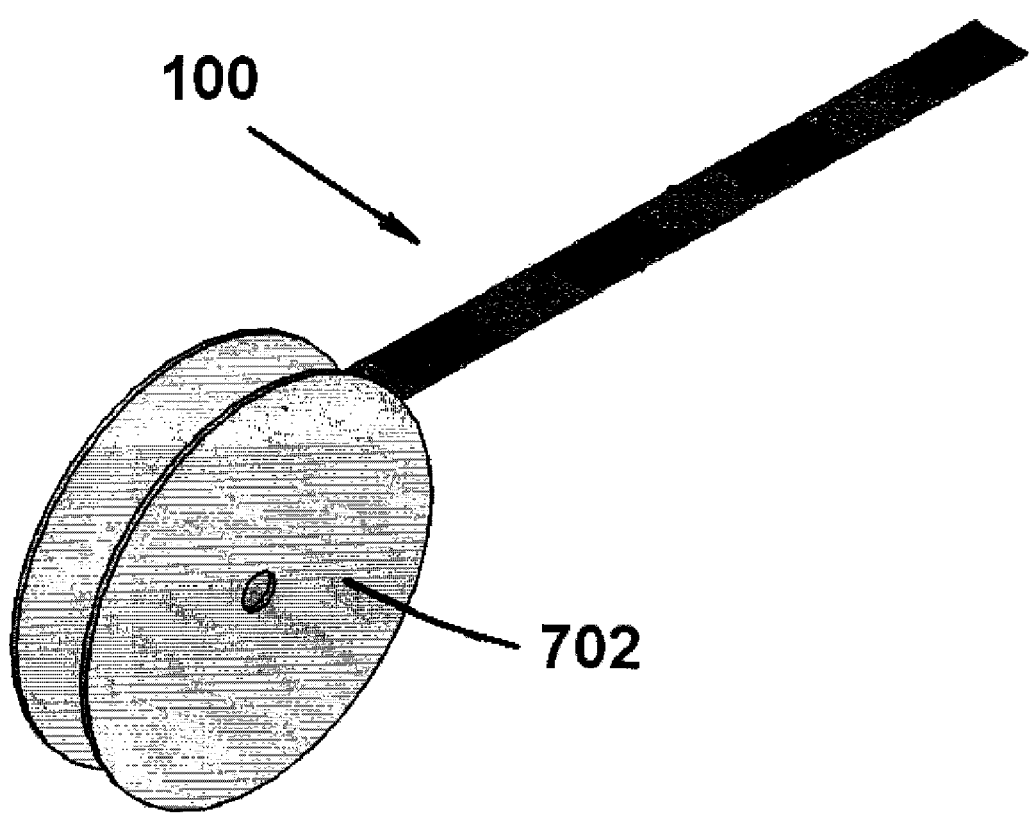
FIG. 7 is a perspective view of the illumination fiber optic ribbon provided on a reel.

As shown in FIG. 7, the ribbon 100 may be provided on a reel 702. On such longer lengths of ribbon 100 with several non-twisted segments alternating with several twisted segments, a desired smaller length of ribbon 100 may be provided by severing a non-twisted segment, such as 106b, and still provide an efficient connection to the light source at the optimum acceptance angle.

As shown in FIG. 1, the sheath 110 substantially encloses the optically-transmissive fibers 102. The sheath 110 may include panels 112 and 114 forming the sides of the ribbon 100. Alternatively, the sheath 110 may have only one panel leaving the fibers 102 exposed on the opposite side. The sheath 110 can be made of a substantially transparent material, reflective material, opaque material, or a combination of such materials. For example, the substantially transparent material may be MYLAR, TEFLON, a polymer such as TEDLAR, a plastic material such as polyvinyl chloride, or other similarly transparent material. The reflective material may be aluminum foil, MYLAR, MYLAR composite, titanium oxide (TiO2), white reflective paint, or any other substantially reflective material. The opaque material can be polyester film, plastic film, polypropylene, polyethylene, polyvinyl chloride (PVC), vinyl, TEFLON, or another substantially opaque material. The combination of substantially transparent and substantially reflective material is preferably used when only one side of the ribbon 100 provides illumination to an area, e.g., when the ribbon 100 is positioned on a floor or a wall. The substantially transparent portion of the sheath 110 is positioned toward the area to be illuminated, and the substantially reflective portion of the sheath 110 is provided on the side away from the area to be illuminated, e.g., the floor or the wall. The light emitted from the side of the ribbon 100 away from the area to be illuminated is reflected back by the substantially reflective portion of the sheath 110 to maximize the light for illumination.

Figure 8:
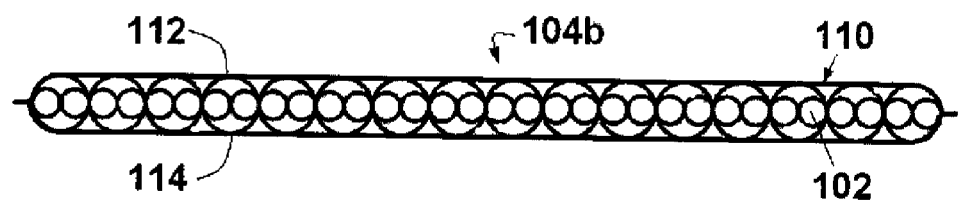
FIG. 8 is a sectional view of the illumination fiber optic ribbon taken along line 8-8 of FIG. 1.
Figure 9:
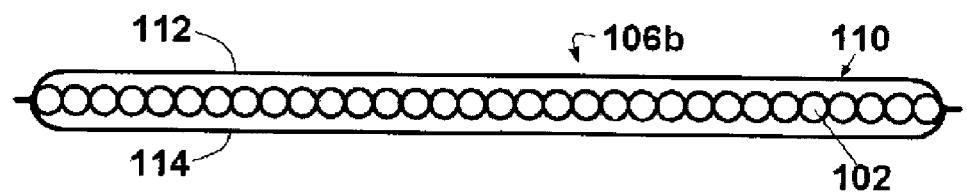
FIG. 9 is a sectional view of the illumination fiber optic ribbon taken along line 9-9 of FIG. 1.

Referring to FIGS. 8 and 9, the sheath 110 may be coupled to the optically-transmissive fibers 102. The coupling can be by bonding, lamination, extrusion, and other similar processes. Preferably, the sheath 110 is coupled to the optically-transmissive fibers 102 by an adhesive, such as a polyester adhesive. In one embodiment, the sheath 110 is coupled to both the twisted segments 104a and 104b and the non-twisted segments 106a-106c. Also, prior to coupling, the optically-transmissive fibers 102 may undergo corona etching. Corona etching is a process where the optically-transmissive fibers 102 are disposed between electrodes that provide an electrical discharge or "corona" onto a surface 210 (shown on FIG. 2) of the optically-transmissive fibers 102. The electrical discharge increases the surface tension of the surface 210 so that the surface 210 is more receptive to the adhesive film.

In FIG. 8, the coupling of the twisted section 104b to the sheath 110 is shown. The optically-transmissive fibers 102 are coupled at substantially the same center-to-center distance from each other. They can also be coupled to the sheath 110 at different center-to-center distances. Other twisting segments, such as 104a, are also coupled to the sheath 110 similar to the coupling between the twisting segment 104b and the sheath 110 described above.

In FIG. 9, the coupling of the non-twisted segments 106b to the sheath 110 is shown. Similar to the twisted section 104b, the optically-transmissive fibers 102 are coupled at substantially the same center-to-center distance from each other. They may also be coupled to the sheath 110 at different center-to-center distances. As an example, by locating optically-transmissive fibers 102 at substantially the same center-to-center distance from each other, the ribbon 100 can be connected to a planar array light source that requires the optically-transmissive fibers 102 to be in the same centerline plane with each fiber 102 being equidistant with an adjacent fiber 102. Also, other non-twisted segments, such as 106a or 106c, are coupled to the sheath 110 similar to the coupling between non-twisted segment 106b and the sheath 110.

Substantially all of the optically-transmissive fibers 102 in the non-twisted segments, such as end segment 106a, can be simultaneously positioned since all the optically-transmissive fibers 102 are coupled to the sheath 110. That way, all of the fibers 102 of the non-twisted segment 106a may be positioned for light to enter at the optimum acceptance angle of the optically-transmissive fibers 102 to facilitate connection of the fibers 102 to the light source 302.

Figure 10:
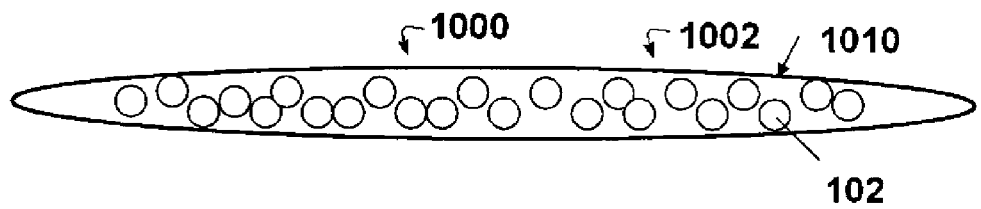
FIG. 10 is a sectional view of an illumination fiber optic ribbon taken along 9-9 of FIG. 1 according to another embodiment of the present invention.

In another embodiment, as seen in FIG. 10, a ribbon 1000 includes a sheath 1010 that is substantially similar to ribbon 100, except the sheath 1010 is coupled only to the twisted segments and not the non-twisted segments such that the fibers 102 of the non-twisted segments 1002 are loose. The coupling of the twisted segments to the sheath 1010 is similar to the coupling described above for twisted segments 106a and sheath 110. By not coupling the optically-transmissive fibers 102 of the non-twisted segments 1002 to the sheath 1010, an installer can sever the ribbon 1000 at the non-twisted segment 1002 and group the optically-transmissive fibers 102 for connecting to a non-planar array light source as desired, such as at the optimum acceptance angle.

Referring to FIG. 3, a plan view of the illumination fiber optic ribbon 100 is shown. Preferably, one of the non-twisted segments, such as 106a, is connected to the light source 302. When the ribbon 100 is connected to the light source 302, the light flux from the light source 302 is transmitted into the optically-transmissive fibers 102. By using the non-twisted segment 106a the optically-transmissive fibers 102 may be positioned into the optimum acceptance angle of the optically-transmissive fibers 102 for connection to the planar array light source. Since there are no bends 116 in the non-twisted segments 106a-106c, when the light flux is transmitted through the non-twisted segments 106a-106c, no light emits and so the light flux is conserved for illumination. When the light flux is transmitted through the twisted segments 104a and 104b, some of the light from the light flux is emitted from the bends 116.

Figure 12:
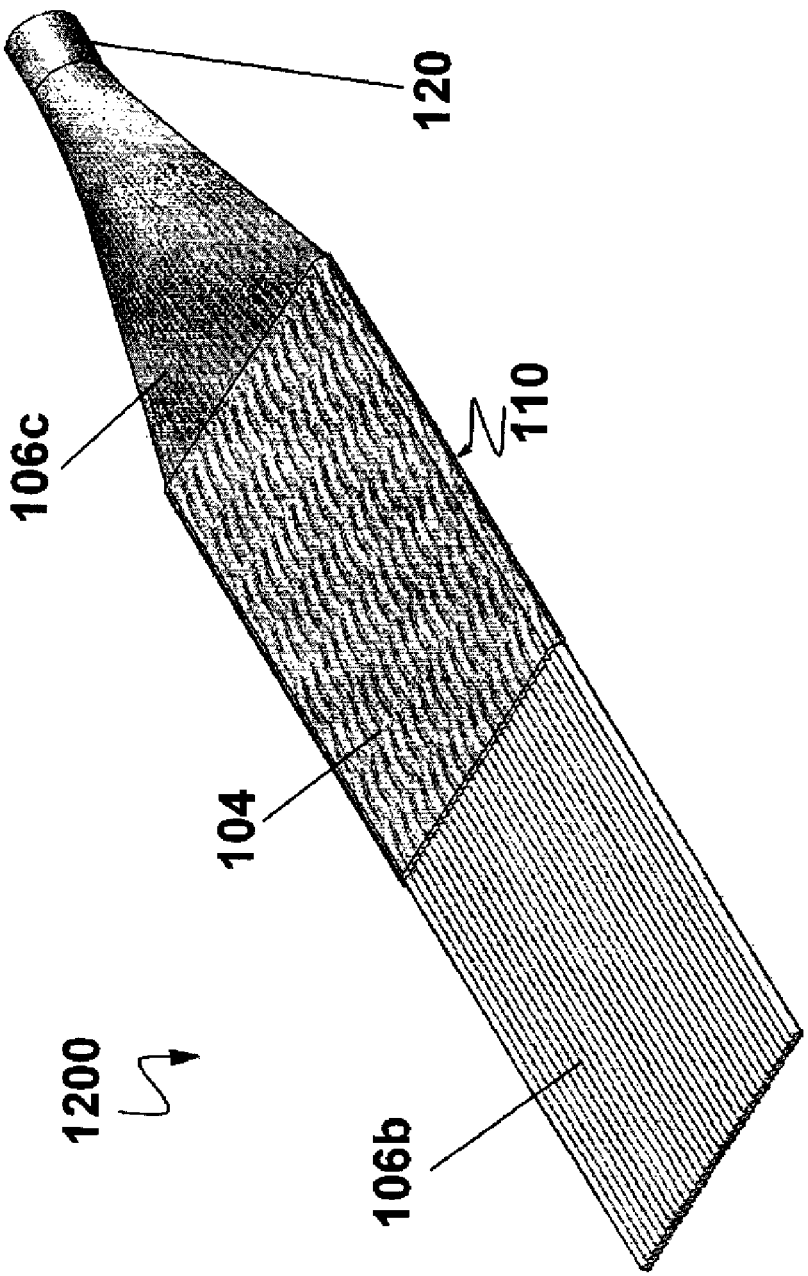
FIG. 12 is a partial perspective view of an illumination fiber optic ribbon according to yet another embodiment of the present invention.

Referring to FIG. 12, a perspective view of an alternate embodiment of an illumination fiber optic ribbon 1200 is shown. The portion of the fiber optic ribbon 1200 shown has a ferrule 120. The ferrule 120 may be provided at one end or both ends of the fiber optic ribbon 1200. In the preferred embodiment, optically-transmissive fibers 102 in a non-twisted segment 106b-106c where the fibers 102 are not coupled to the sheath 110 are gathered to form a substantially circular bundle which is then inserted into the ferrule 120. In alternate embodiments, the fibers 102 can be gathered to form a non-circular bundle.

The ferrule 120 allows the ribbon 1200 to be coupled to an illuminator (not shown). The ferrule 120 accurately aligns the fibers 120 to the illuminator. The ferrule 120 also protects the stripped ends of the optically-transmissive fibers 120. The ferrule 120 can be made of glass, plastic, metal, ceramic material, combinations of the aforementioned, or any other suitably rigid material. In the preferred embodiment, the ferrule 120 is made of a metal, such as aluminum or steel.

Figure 13:
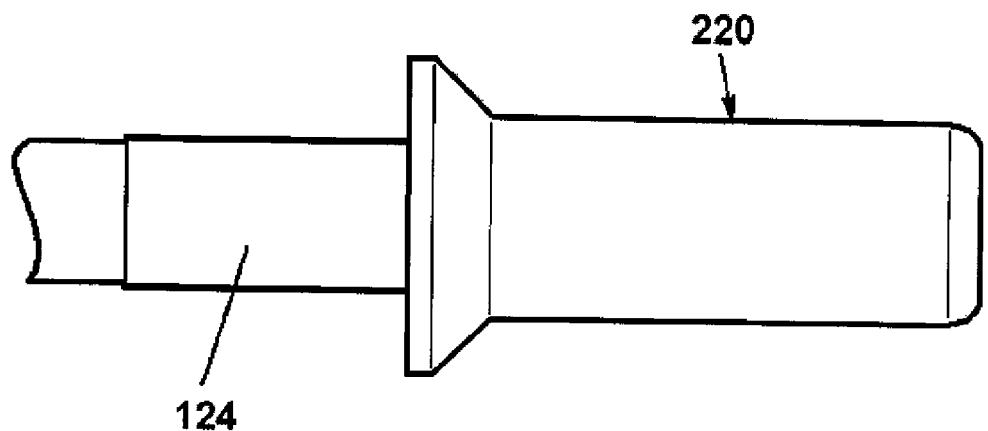
FIG. 13 is a side elevational view of a ferrule of the illumination fiber optic ribbon illustrated in FIG. 12 according to an exemplary embodiment of the present invention.
Figure 14:
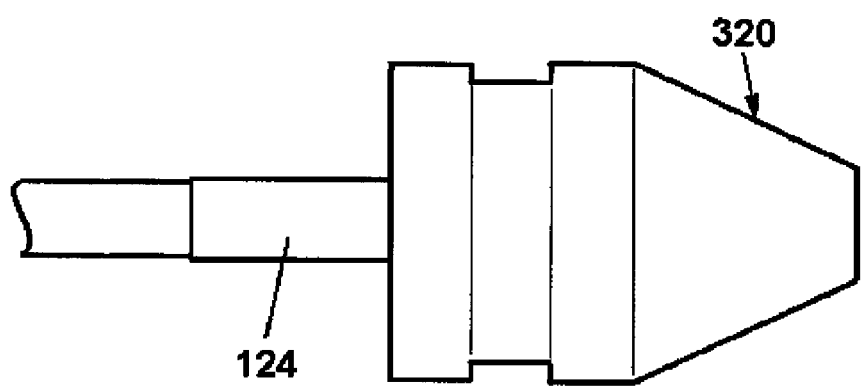
FIG. 14 is a side elevational view of a ferrule of the illumination fiber optic ribbon illustrated in FIG. 12 according to another embodiment of the present invention.

The shape of the ferrule 120 is determined by the mating receptacle of the illuminator. The illuminator can be a metal halide illuminator, a quartz halogen illuminator, a light emitting diode (LED) illuminator, or any other suitable light source. Illuminators are commercially available from Fiberstars, Inc. or DiCon Fiberoptics, Inc. Referring to FIGS. 13 and 14, alternate embodiments of the ferrules 220 and 320 are shown. In FIG. 13, the ferrule 220 has a generally tubular shape that can be received by an LED illuminator made by DiCon Fiberoptics, Inc. In FIG. 14, the ferrule 320 has a shape that can be inserted into a metal halide illuminator made by Fiberstars, Inc.

The ribbon 1200 can also have a wrapping 124 as shown in FIGS. 13-14. The wrapping 124 bundles and keeps the fibers 102 together during manufacture. The wrapping 124 is preferably a tube of predetermined length that can be slipped over the fibers 102 and then heated to shrink around the fibers 102. In the preferred embodiment, the wrapping 124 does not substantially extend into the ferrule 220 or 320.

Figure 15:
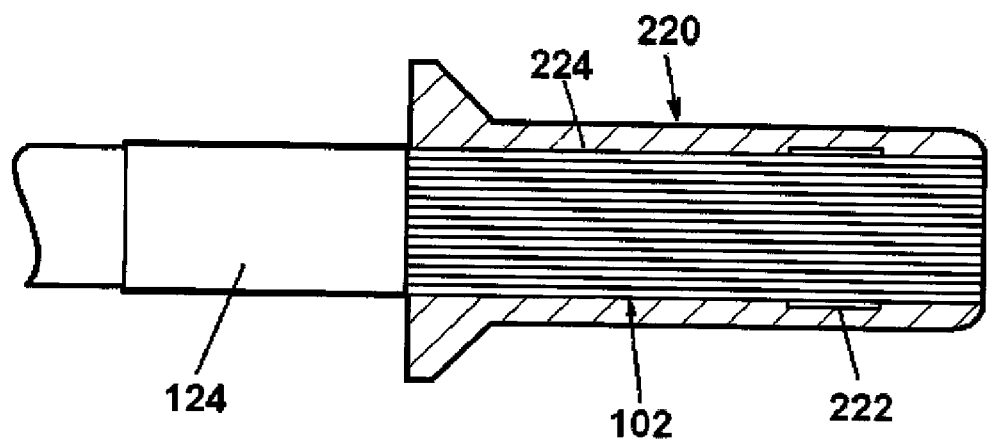
FIG. 15 is a sectional view of the ferrule illustrated in FIG. 13.
Figure 16:
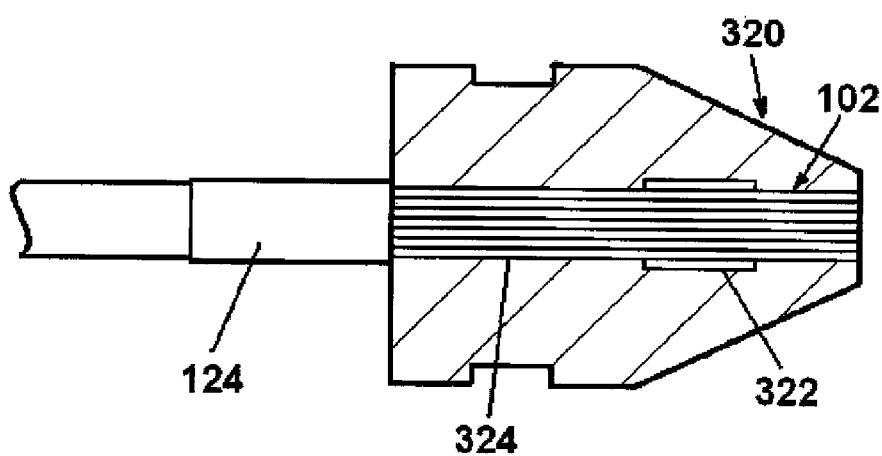
FIG. 16 is a sectional view of the ferrule illustrated in FIG. 14.

Referring to FIGS. 15 and 16, cross-sectional views of the ferrules 220 and 320 are shown. After the fibers 102 are bundled together in a substantially cylindrical bundle, the fibers 102 are inserted into a substantially cylindrical bore 224 or 324 of the ferrules 220 or 320. The bore 224 and 324 also has a ring 222 and 322 machined internally within the bore 224 and 324. The ring 222 and 322 has a diameter slightly larger than the diameter of the bore 224 and 324. During manufacturing of the ribbon 1200, the ferrule 120, 220, or 320 and the fibers 102 may be heated. Because the ferrule material and the materials used for the components of the fibers 102 (such as a covering protecting the core 202 and the cladding 204) do not expand at the same rate when heated, the ring 222 or 322 provides stress relief by allowing components of the fibers 102 to thermally expand into the ring 222 or 322. Also, the expansion of the components of the fibers 102 into the ring 222 or 322 couples the fibers 102 to the ferrule 120. In one exemplary embodiment, the ring 222 or 322 is located approximately a quarter of the overall length of the ferrule 220 or 320 away from the front of the ferrule 220 or 320 and has dimensions of approximately 12.7 mm (approximately 0.50 inches) in width and approximately 1.27 mm (approximately 0.050 inches) in depth. Also, the wrapping 124 does not substantially extend into the ferrule 220 or 320.

A method for manufacturing the illumination fiber optic ribbon 100 begins with placing optically-transmissive fibers 102 adjacent to one another in generally the same plane. As described previously, the number of optically-transmissive fibers 102 can be varied in order to achieve the required size. Next, adjacent optically transmissive-fibers 102 are twisted for a predetermined portion of their respective lengths to form at least one twisted segment 104a or 104b. By twisting the adjacent optically-transmissive fibers 102 into pairs, bends 116 are formed from which light is emitted. In alternate embodiments, the cladding 202 may be distorted mechanically, chemically, or by other similar processes that affect the index of refraction of the cladding 202. The cladding 202 may also be disrupted to allow light emission. Next, non-twisted segments 106a, 106b, and 106c are provided where the optically-transmissive fibers 102 are not twisted. Next, the twisted segments 104a and 104b and non-twisted segments 106a-106c are alternated. Finally, the number of bends 116 per unit length may be increased as the length of the ribbon 100 increases. As discussed above, increasing the number of bends 116 per unit length can compensate for the attenuation of light as the length of the ribbon 100 increases. By providing more bends 116 per unit length, more light can be emitted from the ribbon 100.

The sheath 110 may be coupled to both the twisted segments 104a and 104b and non-twisted segments 106a-106c. Alternatively, the sheath 110 may be coupled only to the twisted segments 104a and 104b. The light source 302 can be disposed at one end of the optically-transmissive fibers 102 and coupled to a non-twisted segment 106a. A second light source (not shown) may be coupled to the opposite end of the ribbon 100 such as at segment 106c. Corona etching the plurality of optically-transmissive fibers 102 may be done prior to coupling the optically-transmissive fibers 102 to the sheath 110, preferably before placing optically-transmissive fibers 102 adjacent to one another.

To manufacture a ribbon 1200 with ferrules 120, the optically-transmissive fibers 102 of a non-twisted segment 106a-106c where the fibers 102 are not coupled to the sheath 110 are gathered together to form a bundle. Then, preferably the wrapping 124 is placed over the ends of the fibers 102. The wrapping 124 is cut to a predetermined length, and preferably the length of the wrapping 124 is such that it does not substantially extend into the ferrule 120. The fibers 102 are approximately cut to length with, preferably, scissors. A ferrule 120 of predetermined shape is placed on the cut fibers 102. The fibers 102 are then sheared, preferably by a hot knife, at a distance extending from the front of the ferrule 120 by approximately 1.27 mm (approximately 0.050 inches). The shape of the ferrule 120 is determined by the mating receptacle of the light source 302. The ferrule 120 and the fibers 102 are placed in an oven to couple the ferrule 120 to the fibers 102. The cut ends of the fibers 102 are then polished to a glass-like finish.

As apparent from the above description, the present invention provides an illumination fiber optic ribbon. Optically-transmissive fibers are placed adjacent to each other to form a generally flat ribbon. Twisting adjacent optically-transmissive fibers forms twisted segments which alternate with non-twisted segments where adjacent optically-transmissive fibers are not twisted. The twisting of adjacent-optically transmissive fibers forms bends from which light is emitted. The number of bends may increase as the length of the ribbon increases. A sheath may substantially surround the optically-transmissive fibers.

Accordingly, when a light source is coupled to one end of the optically-transmissive fibers, the light source emits a light flux into one end of the optically-transmissive fibers. The light flux then emanates from the bends to provide illumination.

While particular embodiments have been chosen to illustrate the invention, it will be understood by those skilled in the art that various changes and modifications can be made therein without departing from the scope of the invention as defined in the appended claims.

What is claimed is:

1. An illumination fiber optic ribbon comprising:
   a plurality of optically-transmissive fibers disposed adjacent to each other as two or more twisted pairs, each twisted pair having two optically-transmissive fibers with portions thereof twisted together to form a twisted segment and portions thereof substantially parallel to one another to form a non-twisted segment; and
   a plurality of bends disposed along each twisted segment, the plurality of bends being formed by the twisting of the two optically-transmissive fibers in each twisted pair,
   wherein said non-twisted segment in each twisted pair is configured to connect to a light source, said light source emitting a light flux into said twisted and non-twisted segments of each twisted pair so that light from said light source is emitted from said plurality of bends disposed along each twisted segment.

2. An illumination fiber optic ribbon according to claim 1, wherein each of said plurality of optically-transmissive fibers includes:
   a core of optically-transparent material having a first index of refraction; and
   a cladding surrounding said core, said cladding having a second index of refraction different than said first index of refraction of said core.

3. An illumination fiber optic ribbon according to claim 2, wherein said plurality of bends change the second index of refraction so that a light ray in said core can emit through said cladding.

4. An illumination fiber optic ribbon according to claim 2, wherein the cladding is at least one of distorted chemically, distorted mechanically, and disrupted so that a light ray in said core can emit through said cladding.

5. An illumination fiber optic ribbon according to claim 2, wherein said cladding is corona etched to make it more receptive to adhesives.

6. An illumination fiber optic ribbon according to claim 1, further comprising a sheath substantially enclosing said plurality of optically-transmissive fibers.

7. An illumination fiber optic ribbon according to claim 6, wherein said sheath is coupled to said plurality of optically-transmissive fibers.

8. An illumination fiber optic ribbon according to claim 7, wherein said sheath is coupled only to said twisted segments by an adhesive film.

9. An illumination fiber optic ribbon according to claim 7, wherein said coupling is by an adhesive disposed on an inner surface of said sheath.

10. An illumination fiber optic ribbon according to claim 9, wherein said adhesive film is a polyester adhesive.

11. An illumination fiber optic ribbon according to claim 6, wherein said sheath is substantially transparent.

12. An illumination fiber optic ribbon according to claim 6, wherein a portion of said sheath is opaque.

13. An illumination fiber optic ribbon according to claim 6, wherein
on a front side of said plurality of optically-transmissive fibers said sheath is formed of a substantially transparent material; and
on a back side of said plurality of optically-transmissive fibers said sheath is formed of reflective material so that light emitted from said back side of said plurality of optically-transmissive fibers is reflected off of the reflective material and emitted through the substantially transparent material.

14. An illumination fiber optic ribbon according to claim 1, wherein said light source is an electrically-powered light source, a solar-powered light source, a natural light source, a metal halide illuminator, a quartz halogen illuminator, or a light emitting diode illuminator.

15. An illumination fiber optic ribbon according to claim 1, wherein said plurality of bends increase in number per unit length as their distance from one end of the fiber optic ribbon increases.

16. An illumination fiber optic ribbon according to claim 1, further comprising a ferrule provided at an end of said ribbon.

17. An illumination fiber optic ribbon comprising:
a plurality of optically-transmissive fibers disposed adjacent to each other, at least two of said plurality of optically-transmissive fibers having portions thereof twisted together to form a twisted segment and portions thereof substantially parallel to one another to form a non-twisted segment;
a plurality of bends disposed along said twisted segment, the plurality of bends being formed by the twisting of said adjacent optically-transmissive fibers;
said non-twisted segment being capable of connection to a light source, said light source emitting a light flux into said twisted and non-twisted segments of said plurality of optically-transmissive fibers so that light from said light source is emitted from said plurality of bends along said twisted segment; and
a sheath substantially enclosing said plurality of optically-transmissive fibers, said sheath being formed of a substantially transparent material on a front side of said plurality of optically-transmissive fibers and being formed of a reflective material on a back side of said plurality of optically-transmissive fibers so that light emitted from said back side of said plurality of optically-transmissive fibers is reflected off of the reflective material and emitted through the substantially transparent material.

18. An illumination fiber optic ribbon according to claim 17, wherein each of said plurality of optically-transmissive fibers includes:
a core of optically-transparent material having a first index of refraction; and
a cladding surrounding said core, said cladding having a second index of refraction different than said first index of refraction of said core.

19. An illumination fiber optic ribbon according to claim 18, wherein said plurality of bends change the second index of refraction so that a light ray in said core can emit through said cladding.

20. An illumination fiber optic ribbon according to claim 18, wherein the cladding is at least one of distorted chemically, distorted mechanically, and disrupted so that a light ray in said core can emit through said cladding.

21. An illumination fiber optic ribbon according to claim 18, wherein said cladding is corona etched to make it more receptive to adhesives.

22. An illumination fiber optic ribbon according to claim 17, wherein said sheath is coupled to said plurality of optically-transmissive fibers.

23. An illumination fiber optic ribbon according to claim 22, wherein said sheath is coupled only to said twisted segments.

24. An illumination fiber optic ribbon according to claim 22, wherein said coupling is by an adhesive film disposed on an inner surface of said sheath.

25. An illumination fiber optic ribbon according to claim 24, wherein said adhesive film is a polyester adhesive.

26. An illumination fiber optic ribbon according to claim 17, wherein a portion of said sheath is opaque.

27. An illumination fiber optic ribbon according to claim 17, wherein said light source is an electrically-powered light source, a solar-powered light source, a natural light source, a metal halide illuminator, a quartz halogen illuminator, or a light emitting diode illuminator.

28. An illumination fiber optic ribbon according to claim 17, wherein said plurality of bends increase in number per unit length as their distance from one end of the fiber optic ribbon increases.

29. An illumination fiber optic ribbon according to claim 17, further comprising a ferrule provided at an end of said ribbon.

30. A method for manufacturing an illumination fiber optic ribbon, comprising the steps of:
disposing a plurality of optically-transmissive fibers adjacent to one another;
twisting adjacent optically-transmissive fibers into two or more pairs along a portion of their length to form a twisted segment in each pair, each twisted segment forming a plurality of bends at a cladding on each pair of optically-transmissive fibers;
providing a non-twisted segment along a portion of the length of each pair of optically-transmissive fibers in which that pair of adjacent optically-transmissive fibers is not twisted.

31. A method of manufacturing an illumination fiber optic ribbon according to claim 30, further comprising the step of coupling the plurality of optically-transmissive fibers to a sheath.

32. A method of manufacturing an illumination fiber optic ribbon according to claim 30, further comprising the step of coupling only the twisted segments to a sheath.

33. A method of manufacturing an illumination fiber optic ribbon according to claim 30, further comprising the step of disposing a light source at one or both ends of the plurality of optically-transmissive fibers, the light source emitting a light flux into the end of the plurality of optically-transmissive fibers.

34. A method of manufacturing an illumination fiber optic ribbon comprising the steps of:
disposing a plurality of optically-transmissive fibers adjacent to one another;
corona etching the plurality of optically-transmissive fibers prior to coupling the optically-transmissive fibers to a sheath;
twisting adjacent optically-transmissive fibers in a portion of a length of the ribbon to form a twisted segment;
forming a plurality of bends at a cladding on each of said plurality of optically-transmissive fibers by the twisting;

providing a non-twisted segment in a portion of the length of the ribbon in which adjacent optically-transmissive fibers are not twisted; and alternating the non-twisted segments with the twisted segments.

35. A method of manufacturing an illumination fiber optic ribbon comprising the steps of:
    disposing a plurality of optically-transmissive fibers adjacent to one another;
    twisting adjacent optically-transmissive fibers in a portion of a length of the ribbon to form a twisted segment;
    forming a plurality of bends at a cladding on each of said plurality of optically-transmissive fibers by the twisting;
    providing a non-twisted segment in a portion of the length of the ribbon in which adjacent optically-transmissive fibers are not twisted;
    alternating the non-twisted segments with the twisted segments; and
    at least one of chemically distorting, mechanically distorting, and disrupting the cladding so that a light ray can emit through the cladding.

36. A method of manufacturing an illumination fiber optic ribbon according to claim 30, further comprising at least one of the steps of chemically distorting, mechanically distorting, and disrupting the cladding so that a light ray can emit through the cladding.

37. A method of manufacturing an illumination fiber optic ribbon according to claim 30, further comprising the step of increasing the plurality of bends in number per unit length as their distance from one end of the fiber optic ribbon increases.

38. A method of manufacturing an illumination fiber optic ribbon according to claim 30, further comprising the step of providing a ferrule at an end of the ribbon.

39. An illumination fiber optic ribbon comprising:
    a plurality of optically-transmissive fibers disposed adjacent to each other, at least two of said plurality of optically-transmissive fibers having portions thereof twisted together to form a twisted segment and portions thereof substantially parallel to one another to form a non-twisted segment; and
    a plurality of bends disposed along said twisted segment, the plurality of bends being formed by the twisting of said adjacent optically-transmissive fibers
    wherein said non-twisted segment is configured to connect to a light source, said light source emitting a light flux into said twisted and non-twisted segments of said plurality of optically-transmissive fibers so that light from said light source is emitted from said plurality of bends disposed along each twisted segment, and
    wherein said plurality of bends increase in number per unit length as their distance from the light source increases.

40. An illumination fiber optic ribbon according to claim 39, wherein each of said plurality of optically-transmissive fibers includes:
    a core of optically-transparent material having a first index of refraction; and
    a cladding surrounding said core, said cladding having a second index of refraction different than said first index of refraction of said core.

41. An illumination fiber optic ribbon according to claim 40, wherein said plurality of bends change the second index of refraction so that a light ray in said core can emit through said cladding.

42. An illumination fiber optic ribbon according to claim 40, wherein the cladding is at least one of distorted chemically, distorted mechanically, and disrupted so that a light ray in said core can emit through said cladding.

43. An illumination fiber optic ribbon according to claim 40, wherein said cladding is corona etched to make it more receptive to adhesives.

44. An illumination fiber optic ribbon according to claim 39, further comprising a sheath substantially enclosing said plurality of optically-transmissive fibers.

45. An illumination fiber optic ribbon according to claim 44, wherein said sheath is coupled to said plurality of optically-transmissive fibers.

46. An illumination fiber optic ribbon according to claim 45, wherein said sheath is coupled only to said twisted segments by an adhesive film.

47. An illumination fiber optic ribbon according to claim 45, wherein said coupling is by an adhesive film disposed on an inner surface of said sheath.

48. An illumination fiber optic ribbon according to claim 47, wherein said adhesive film is a polyester adhesive.

49. An illumination fiber optic ribbon according to claim 44, wherein said sheath is substantially transparent.

50. An illumination fiber optic ribbon according to claim 44, wherein a portion of said sheath is opaque.

51. An illumination fiber optic ribbon according to claim 44, wherein
    on a front side of said plurality of optically-transmissive fibers said sheath is formed of a substantially transparent material; and
    on a back side of said plurality of optically-transmissive fibers said sheath is formed of reflective material so that light emitted from said back side of said plurality of optically-transmissive fibers is reflected off of the reflective material and emitted through the substantially transparent material.

52. An illumination fiber optic ribbon according to claim 39, wherein said light source is an electrically-powered light source, a solar-powered light source, a natural light source, a metal halide illuminator, a quartz halogen illuminator, or a light emitting diode illuminator.

53. An illumination fiber optic ribbon according to claim 39, further comprising a ferrule provided at an end of said ribbon.

54. A method for manufacturing an illumination fiber optic ribbon comprising the steps of:
    disposing a plurality of optically-transmissive fibers adjacent to one another;
    twisting two or more adjacent optically-transmissive fibers along a portion of length of the ribbon to form a twisted segment, each twisted segment forming a plurality of bends at a cladding on each of said plurality of optically-transmissive fibers;
    providing a non-twisted segment in along a portion of length of the ribbon in which said adjacent optically-transmissive fibers are not twisted; and
    enclosing at least said twisted segment of said plurality of optically-transmissive fibers in a sheath, said sheath being formed of a substantially transparent material on a front side of said plurality of optically-transmissive fibers and being formed of a reflective material on a back side of said plurality of optically-transmissive fibers so that light emitted from said back side of said plurality of optically-transmissive fibers is reflected off of the reflective material and emitted through the substantially transparent material.

55. An illumination fiber optic ribbon comprising:
    a plurality of optically-transmissive fibers disposed adjacent to each other, each of said plurality of optically-transmissive fibers including:

a core of optically-transparent material having a first index of refraction, and a cladding surrounding said core, the cladding having a second index of refraction different than said first index of refraction of said core and being corona etched to make it more receptive to adhesives, wherein at least two of said plurality of optically-transmissive fibers are twisted together at first portions to form a twisted segment and are parallel to one another at second portions to form a non-twisted segment;

a plurality of bends disposed along said twisted segment, the plurality of bends formed by the twisting of adjacent optically-transmissive fibers; and said non-twisted segment being capable of connection to a light source, said light source emitting a light flux into said twisted and non-twisted segments of said plurality of optically-transmissive fibers so that light therefrom is emitted from said plurality of bends along said twisted segments.

56. An illumination fiber optic ribbon comprising:

a plurality of optically-transmissive fibers disposed adjacent to each other, each of said plurality of optically-transmissive fibers including:

a core of optically-transparent material having a first index of refraction, and a cladding surrounding said core, the cladding having a second index of refraction different than said first index of refraction of said core and being at least one of distorted chemically, distorted mechanically, and disrupted so that a light ray in said core can emit through said cladding, wherein at least two of said plurality of optically-transmissive fibers are twisted together at first portions to form a twisted segment and are parallel to one another at second portions to form a non-twisted segment;

a plurality of bends disposed along said twisted segment, the plurality of bends formed by the twisting of adjacent optically-transmissive fibers; and said non-twisted segment being capable of connection to a light source, said light source emitting a light flux into said twisted and non-twisted segments of said plurality of optically-transmissive fibers so that light therefrom is emitted from said plurality of bends along said twisted segments.

57. A method for manufacturing an illumination fiber optic ribbon comprising the steps of:

disposing a plurality of optically-transmissive fibers adjacent to one another;

twisting two or more adjacent optically-transmissive fibers along a portion of length of the ribbon to form a twisted segment, each twisted segment forming a plurality of bends at a cladding on each of said plurality of optically-transmissive fibers; and providing a non-twisted segment in along a portion of length of the ribbon in which said adjacent optically-transmissive fibers are not twisted, wherein said plurality of bends increase in number per unit length as their distance from the light source increases.

58. An illumination fiber optic ribbon comprising:

a plurality of optically-transmissive fibers disposed adjacent to each other, at least two of said plurality of optically-transmissive fibers having two or more portions thereof twisted together that form two or more corresponding twisted segments and three or more portions thereof substantially parallel to one another that form three or more corresponding non-twisted segments, said twisted and non-twisted segments alternating along the length of the ribbon;

a plurality of bends disposed along said twisted segments, the plurality of bends being formed by the twisting of adjacent optically-transmissive fibers; and at least one of said three or more non-twisted segments being capable of connection to a light source disposed at one or both ends of said plurality of optically-transmissive fibers, said light source emitting a light flux into said twisted and non-twisted segments of said plurality of optically-transmissive fibers so that light from the light source is emitted from said plurality of bends along said twisted segments.

59. A method for manufacturing an illumination fiber optic ribbon, comprising the steps of:

disposing a plurality of optically-transmissive fibers adjacent to one another;

twisting adjacent optically-transmissive fibers along two or more portions of the ribbon to form two or more corresponding twisted segments, thereby forming a plurality of bends at a cladding on each of said twisted segments; and providing three or more portions of the ribbon in which adjacent optically-transmissive fibers are not twisted to form three or more corresponding non-twisted segments, wherein the non-twisted segments alternate with the twisted segments.

* * * * *